US012769830B2

(12) United States Patent
Kasper et al.

(10) Patent No.: US 12,769,830 B2
(45) Date of Patent: Oct. 20, 2026

(54) DETECTING A SECURITY BYPASS THROUGH BINARY CODE ANALYSIS

(71) Applicant: INTERNATIONAL BUSINESS MACHINES CORPORATION, Armonk, NY (US)

(72) Inventors: Michael Page Kasper, Wappingers Falls, NY (US); Bryan Childs, Poughkeepsie, NY (US); Diane Marie Stamboni, Poughkeepsie, NY (US); Joshua David Steen, Fishkill, NY (US)

(73) Assignee: International Business Machines Corporation, Armonk, NY (US)

(*) Notice: Subject to any disclaimer, the term of this patent is extended or adjusted under 35 U.S.C. 154(b) by 255 days.

(21) Appl. No.: 18/315,603

(22) Filed: May 11, 2023

(65) Prior Publication Data

US 2024/0378290 A1 Nov. 14, 2024

(51) Int. Cl.
*G06F 21/56* (2013.01)

(52) U.S. Cl.
CPC ...... *G06F 21/562* (2013.01); *G06F 2221/033* (2013.01)

(58) Field of Classification Search
None
See application file for complete search history.

(56) References Cited

U.S. PATENT DOCUMENTS

| | | | | |
|---|---|---|---|---|
| 6,859,893 | B2 | 2/2005 | Hines | |
| 7,617,489 | B2 * | 11/2009 | Peyton | G06F 21/577 717/133 |
| 8,074,115 | B2 * | 12/2011 | Stolfo | G06F 11/0772 714/38.1 |
| 8,918,885 | B2 | 12/2014 | McClure et al. | |
| 9,563,420 | B2 * | 2/2017 | Osminer | G06F 9/44589 |
| 9,798,884 | B1 * | 10/2017 | Bishop, III | G06F 21/566 |
| 10,157,057 | B2 | 12/2018 | Kannamparambil et al. | |
| 10,719,606 | B2 | 7/2020 | Diaz et al. | |
| 10,803,166 | B1 * | 10/2020 | Terkowitz | G06F 21/53 |
| 10,831,898 | B1 * | 11/2020 | Wagner | G06F 9/547 |
| 10,915,640 | B2 | 2/2021 | Kasper et al. | |
| 10,936,718 | B2 | 3/2021 | Boulton | |
| 11,347,850 | B2 | 5/2022 | Boulton et al. | |

(Continued)

FOREIGN PATENT DOCUMENTS

KR 101906004 B1 10/2018

OTHER PUBLICATIONS

No stated author; Detecting ACEE modifications; 2021; retrieved from the internet https://www.ibm.com/docs/en/zos/2.4.0?topic=guide-detecting-acee-modifications; pp. 1-5, as printed. (Year: 2021).*

(Continued)

*Primary Examiner* — Michael W Chao
(74) *Attorney, Agent, or Firm* — Onyx IP Group

(57) ABSTRACT

Detecting a security bypass through binary code analysis is disclosed, including identifying one or more binary files of an authorized program; determining, based on a static code analysis of the one or more binary files, that the authorized program includes a potential security bypass, wherein the potential security bypass includes a modification of a system control block; and generating, in response to determining that the authorized program includes a potential security bypass, a security report.

20 Claims, 4 Drawing Sheets

(56) References Cited

U.S. PATENT DOCUMENTS

| | | | | |
|---|---|---|---|---|
| 12,299,138 | B2 * | 5/2025 | Pande | G06F 21/566 |
| 12,314,391 | B2 * | 5/2025 | Carru | G06F 8/60 |
| 12,437,068 | B2 * | 10/2025 | Schmidtler | G06N 20/00 |
| 12,505,211 | B2 * | 12/2025 | Boll | G06F 21/56 |
| 2004/0210581 | A1 * | 10/2004 | Schwartz | G06F 16/25 707/999.009 |
| 2008/0072214 | A1 * | 3/2008 | Peyton | G06F 21/577 717/133 |
| 2009/0307430 | A1 * | 12/2009 | Bruening | G06F 12/0862 711/119 |
| 2012/0198557 | A1 * | 8/2012 | Pistoia | G06F 21/563 726/25 |
| 2013/0091578 | A1 * | 4/2013 | Bisht | G06F 21/53 726/25 |
| 2013/0097706 | A1 * | 4/2013 | Titonis | G06F 21/566 726/22 |
| 2013/0212682 | A1 * | 8/2013 | McClure | G06F 21/577 726/25 |
| 2014/0359776 | A1 * | 12/2014 | Liu | H04L 63/1466 726/25 |
| 2019/0384918 | A1 | 12/2019 | Ndu et al. | |
| 2020/0097662 | A1 * | 3/2020 | Hufsmith | H04L 9/0643 |
| 2021/0073107 | A1 * | 3/2021 | Sharma | G06F 21/577 |
| 2021/0200834 | A1 * | 7/2021 | Adams | G06F 16/972 |
| 2022/0368695 | A1 * | 11/2022 | Upton | G06F 21/32 |
| 2023/0376602 | A1 | 11/2023 | Kasper et al. | |

OTHER PUBLICATIONS

No stated author; ACEE: Accessor Environment Element; 2021; retrieved from the Internet https://www.ibm.com/docs/en/zos/2.4.0?topic=areas-acee-accessor-environment-element; pp. 1-17, as printed. (Year: 2021).*

AYOUL3, GitHub—ayoul3/Privesc: Privilege escalation tools on Mainframe, URL: https://github.com/ayoul3/Privesc, GitHub, Inc., Sep. 10, 2018, retrieved: Feb. 20, 2023, 3 pages.

* cited by examiner

DETECTING A SECURITY BYPASS THROUGH BINARY CODE ANALYSIS

BACKGROUND

Field of the Disclosure

The field of the disclosure is security testing, or, more specifically, methods, apparatus, and products for detecting a security bypass through binary code analysis.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

A secure computing platform presents a complex environment with many authorized interfaces and a large amount of authorized code. Authorized code or programs may be provided as part of the operating system or as part of specific products. Some authorized code may be provided by software vendors or created by customers. For security, platforms may use a fixed control block architecture where status information is maintained in system control blocks that can only be modified by authorized programs. Application programming interfaces (APIs) may be provided for changing these settings through the use of security services; however, programs with sufficient privilege levels can simply bypass the intended interfaces and set the bits directly, thus preventing the security products or services from fully controlling the settings for the system. While security bypasses of this nature may be made with good intentions, they compromise the system integrity of the system due to unintended consequences.

SUMMARY

Methods, apparatuses, and products for detecting a security bypass through binary code analysis according to various embodiments are disclosed. detecting a security bypass through binary code analysis can include: identifying one or more authorized programs in a computing system, identifying one or more binary files of an authorized program; determining, based on a static code analysis of the one or more binary files, that the authorized program includes a potential security bypass, wherein the potential security bypass includes a modification of a system control block; and generating, in response to determining that the authorized program includes a potential security bypass, a security report.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
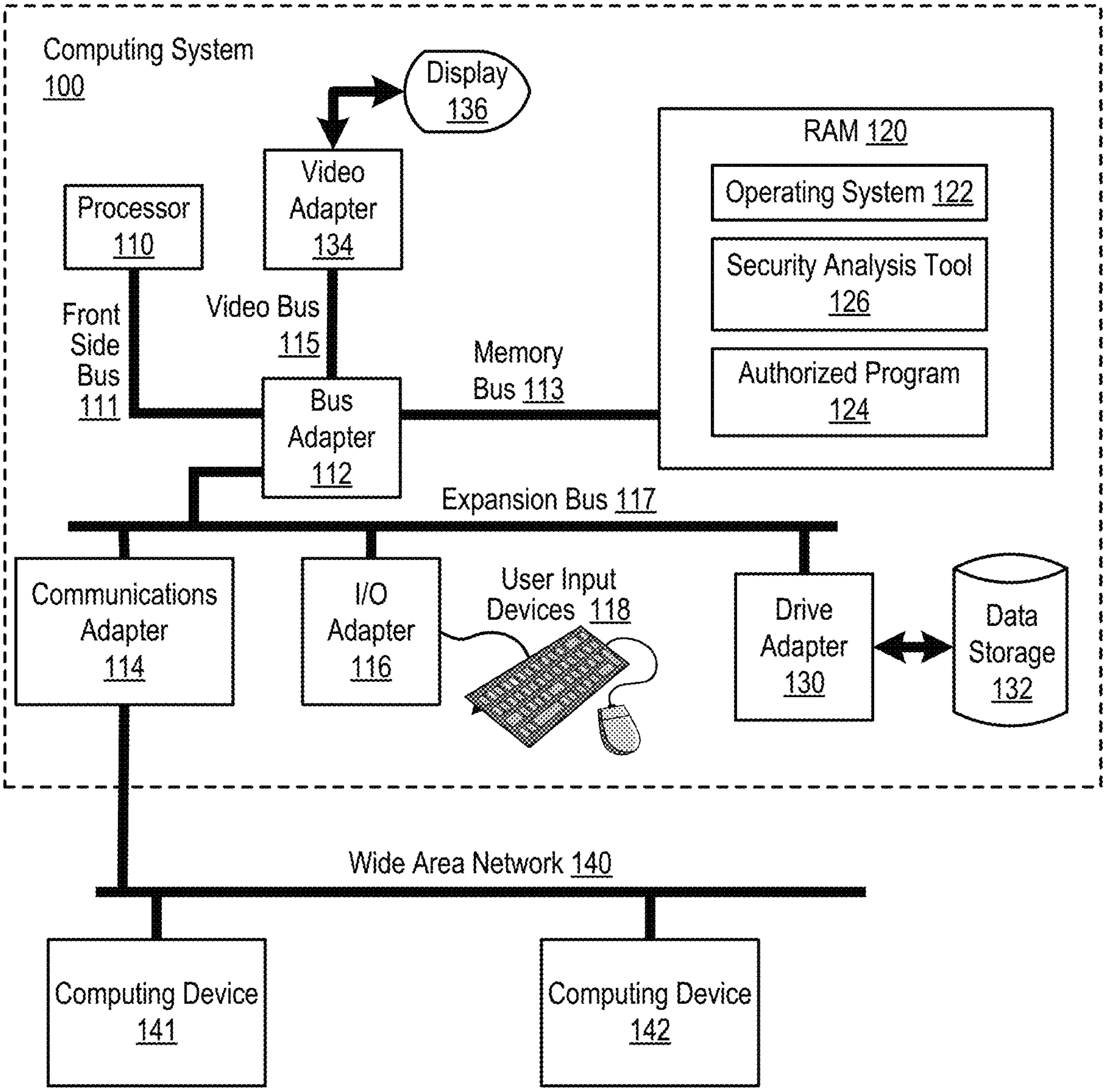
FIG. 1 a block diagram of an example computing system configured for detecting a security bypass through binary code analysis in accordance with embodiments of the present disclosure.

Operating systems, such as the z/OS operating system, contain large amounts of authorized code, which is able to switch to or run in system key and modify system key control blocks. Some of this code is provided as part of the operating system or as part of specific products, while some is provided by software vendors or created by customers. The z/OS operating system includes a fixed control block architecture where status information is maintained in system control blocks that can only be modified by authorized programs. Certain interfaces are provided for changing these settings through the use of security services, however programs with sufficient privilege levels can simply bypass the intended interfaces and set the bits directly, preventing the security products or services for fully controlling the settings for the system. While security bypasses of this nature are usually made with good intentions, they compromise the system integrity of the system due to unintended consequences. In some cases, a security bit could be flipped on while a supervisor call or program call is executing under an unauthorized task, allowing a timer exit that interrupts that task to run with escalated privileges. In other cases, an unexpected error could cause the authorized program that flips the bit to leave it on, allowing any other work running from that point on in the address space to run with elevated privileges. In any case, bypassing the intended security interfaces for assigning privileges creates additional risks.

Two system control blocks of particular interest include that the accessor environment element (ACEE) control block and the job step control block (JSCB) in the z/OS operating system. While some features provided by access control facilities can detect security bypasses for the ACEE control block, they can only detect them if the code is driven while checking is active, after the bypass has occurred, and only analyzes the ACEE (i.e., not the JSCB or other potentially security relevant control blocks within z/OS). Another technique is to scan for two specific instructions, a LOAD followed by an OR IMMEDIATE instruction with specific offsets in supervisor call (SVC) routines. However, such a technique does not scan program call or AC(1) routines, and does not establish these instructions are really referencing control blocks of interest. Such a technique could also be easily fooled by making a minor modification to the program to escape detection, whereas a more robust solution could take that into account with code disassembly and analysis for more reliable results.

Embodiments in accordance with the present disclosure provide a security tool that scans all of this code, first locating the load modules of interest using established methods and then scanning, disassembling, parsing, and analyzing the resulting load modules in order to find instances of security relevant control block settings being manipulated directly instead of using established security interfaces that can be controlled by an installation. A static code analysis is employed to detect specific actions implemented by the analyzed code and a platform-specific security analysis is employed to identify security risks and bypasses presented by those actions.

A platform-specific security analysis is facilitated by understanding the system internals to detect when code is manipulating the security settings that allows for bypasses. Embodiments in accordance with the present disclosure identify platform-specific security bypasses using knowledge of platform control block structures, base pointers, and offsets to determine if specific bits are being set or cleared by the binary code and determine whether such manipulation creates a security risk. Embodiments in accordance with the present disclosure identify security risks by detecting privilege escalation risks related to platform security settings that affect user authority levels.

When such a security bypass is detected, for example an ACEE or JSCB modification, the line of code, load module, and library making the modification may be flagged as the source of a security bypass, and a report may be provided with the list of all security bypasses so appropriate action can be taken such as removing authorization from unsafe libraries or even deleting or uninstalling any products that are creating risks for the system.

Exemplary apparatus and systems for detecting a security bypass through binary code analysis in accordance with the present disclosure are described with reference to the accompanying drawings, beginning with FIG. 1. FIG. 1 sets forth a block diagram of automated computing machinery comprising an exemplary computing system 100 configured for detecting a security bypass through binary code analysis according to embodiments of the present disclosure. The computing system 100 of FIG. 1 includes at least one computer processor 110 or 'CPU' as well as random access memory ('RAM') 120 which is connected through a high speed memory bus 113 and bus adapter 112 to processor 110 and to other components of the computing system 100.

Stored in RAM 120 is an operating system 122. Operating systems useful in computers configured for detecting a security bypass through binary code analysis according to embodiments of the present disclosure include z/OS™, UNIX™, Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. Also stored in RAM is an authorized program 124 that can access restricted resources including security-related resources.

Also stored in RAM is a security analysis tool 126 configured for detecting a security bypass through binary code analysis according to embodiments of the present disclosure. The security analysis tool 126 is a computer program configured to identify potential security risks, security bypasses, and privilege escalation in the authorized program 124. In some examples, the security analysis tool 126 is embodied in a set of computer program instructions that, when executed by the processor 110, cause the computing system 100 to carry out the automated steps of: identifying one or more authorized programs in a computing system, identifying one or more binary files of an authorized program; determining, based on a static code analysis of the one or more binary files, that the authorized program includes a potential security bypass, wherein the potential security bypass includes a modification of a system control block; and generating, in response to determining that the authorized program includes a potential security bypass, a security report. The authorized program may be, for example, an AC(1) program, a supervisor call (SVC) routine, or a program call (PC) routine, or a program in the Program Properties Table (PPT). The system control block may include security settings for a user, job, or environment, where the security setting includes a privilege and/or an authorization. The system control block may be, for example, an accessor environment element (ACEE) and a job step control block (JSCB). A security interface may be provided for changing the one or more security settings, where the modification of the system control block bypasses the security interface. In some examples, the static code analysis includes identifying a system control block architecture of an operating system; and determining, based on the system control block architecture, whether one or more processor instructions modifies a particular system control block field. The system control block architecture may include a control block chain defined by pointers and offsets.

The computing system 100 of FIG. 1 includes disk drive adapter 130 coupled through expansion bus 117 and bus adapter 112 to processor 110 and other components of the computing system 100. Disk drive adapter 130 connects non-volatile data storage to the computing system 100 in the form of data storage 132. Disk drive adapters useful in computers configured for inserting sequence numbers into editable tables according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for inserting sequence numbers into editable tables according to embodiments of the present disclosure include modems for wired dial-up communications, Ethernet (IEEE 802.3) adapters for wired data communications, and 802.11 adapters for wireless data communications. The communications adapter 114 of FIG. 1 is communicatively coupled to a wide area network 140 that also includes other computing devices, such as computing devices 141 and 142 as shown in FIG. 1.

Figure 2:
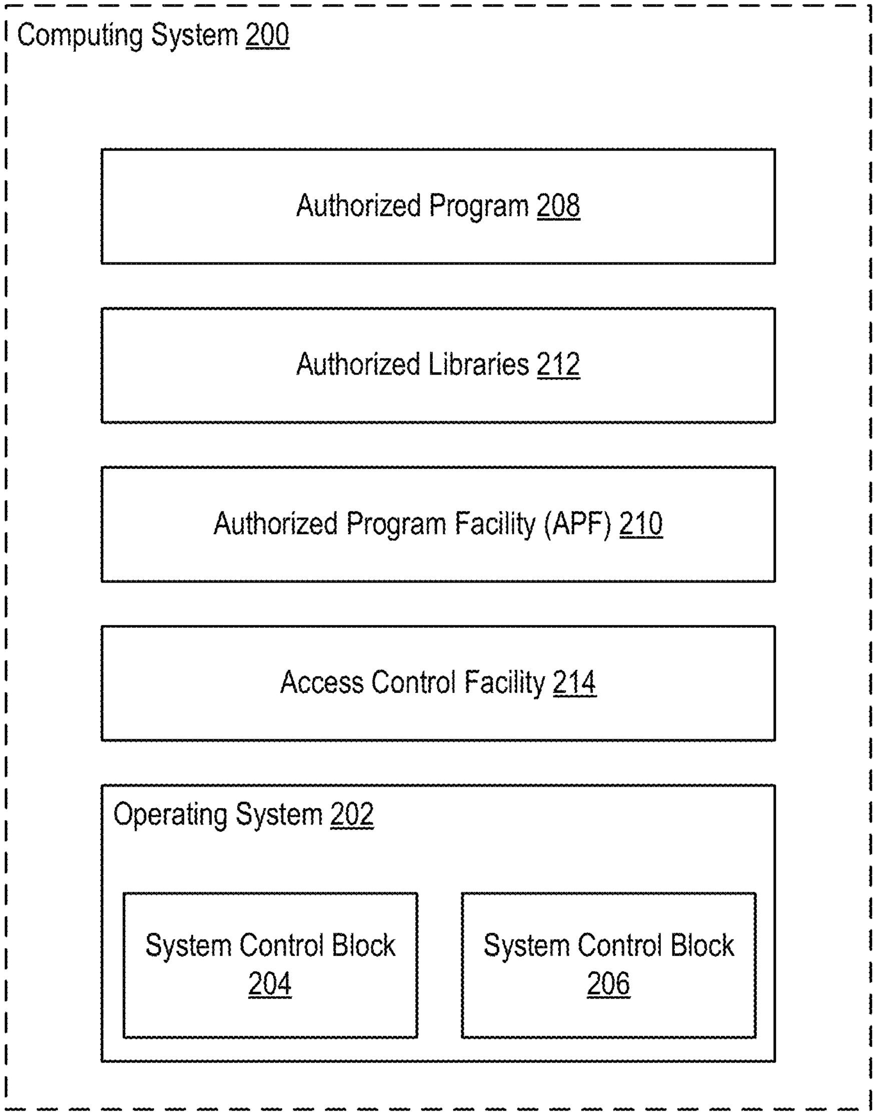
FIG. 2 is a block diagram of an example platform for detecting a security bypass through binary code analysis according to some embodiments of the present disclosure.

For further explanation, FIG. 2 sets forth a flowchart illustrating an example computing system detecting a security bypass through binary code analysis according to embodiments of the present disclosure. The example system 200 includes an operating system 202. The operating system 202 may include or utilize various system control blocks 204, 206 that include security settings used to control whether a user, program, or environment has special privileges or authorizations. For example, these security settings can be used to escalate the privileges of a particular user or bypass password protection for a dataset. The system control blocks 204, 206 may have a particular architecture that is defined by the computing system, including specified storage locations and offsets for particular bits that control settings. For example, the offset of a particular bit or field that is used to specify whether the user, program, or environment has special privileges or authorizations. In the z/OS operating system, for example, the ACEE control block can control whether someone has special privileges or operator privileges for a particular address space, and the JSCB can control whether someone is running authorized or in bypass mode for dataset access. If a program is authorized, it can change privileges for a user, job, or environment and bypass security measures using control block settings. Control blocks are in system key. While control blocks should only be modified through security services and products such as an access control facility 214 (e.g., the resource access control facility (RACF) in the z/OS operating system), an authorized program can switch into system key and modify the settings directly.

An authorized program 208 can run with an elevated privilege to access virtually any resource. For example, an authorized program can put itself into supervisor state or a system key, it can modify system control blocks, it can execute privileged instructions (while in supervisor state), and it can turn off logging. Thus, such authorization must be given out sparingly and monitored carefully. In the z/OS operating system, the system considers a program authorized if the program has one or more of the following characteristics: runs in supervisor state (bit 15 of the program status word (PSW) is zero); runs with PSW key 0-7 (bits 8-11 of the PSW are in the range 0-7); runs under an APF-authorized job step task. In some examples, an authorized program is linked to an access control code. In z/OS, for example, an authorized program may be linked with SETCODE AC(1). A program linked to AC(1) can use the MODESET service to switch to a supervisor state and system key. This is in contrast to a program that is not AC(1) which cannot make use of the MODESET service to switch to a supervisor state and system key. While in supervisor state, a program can execute restricted machine instructions. In storage protection (or system) key 0, a program can access all main storage of the computer. This means that it is possible for authorized programs to circumvent all standard z/OS security mechanisms and gain access to secured data.

The operating system 202 also includes authorized programs and services, including supervisor calls (SVCs) program calls (PCs), and exit routines. Many system functions, such as SVC or PC routines, are sensitive. Access to these functions must be restricted to only authorized programs to avoid compromising the security and integrity of the system.

An authorized program facility (APF) 210 is used to allow an installation to identify system or user programs that can use sensitive system functions. To maintain system security and integrity, a program must be authorized by the APF before it can access restricted functions, such as supervisor calls (SVC) or SVC paths. The APF helps to avoid integrity exposures as the installation identifies which libraries contain special functions or programs. These libraries are then called APF authorized libraries 212.

An installation can use the APF to identify system or user programs that can use sensitive system functions. For example, the APF allows an installation to restrict the use of sensitive SVC routines to APF-authorized programs and allow the system to fetch modules in an authorized job step task only from authorized libraries.

In the z/OS operating system, for example, APF-authorized programs must reside in one of the following authorized libraries: SYS1.LINKLIB; SYS1.SVCLIB, SYS1.LPALIB; authorized libraries specified by an installation, such as a library protected by an access control facility 214 (e.g., RACF in the z/OS operating system). Authorized libraries are defined in an APF list, or in the link pack area. Any module in the link pack area will be treated by the system as though it came from an APF-authorized library. An installation should ensure that it has properly protected libraries that contribute modules to the link pack area to avoid system security and integrity exposures, just as it would protect any APF-authorized library. The APF can also prevent authorized programs from using a load module that is not in an APF-authorized library.

Figure 3:
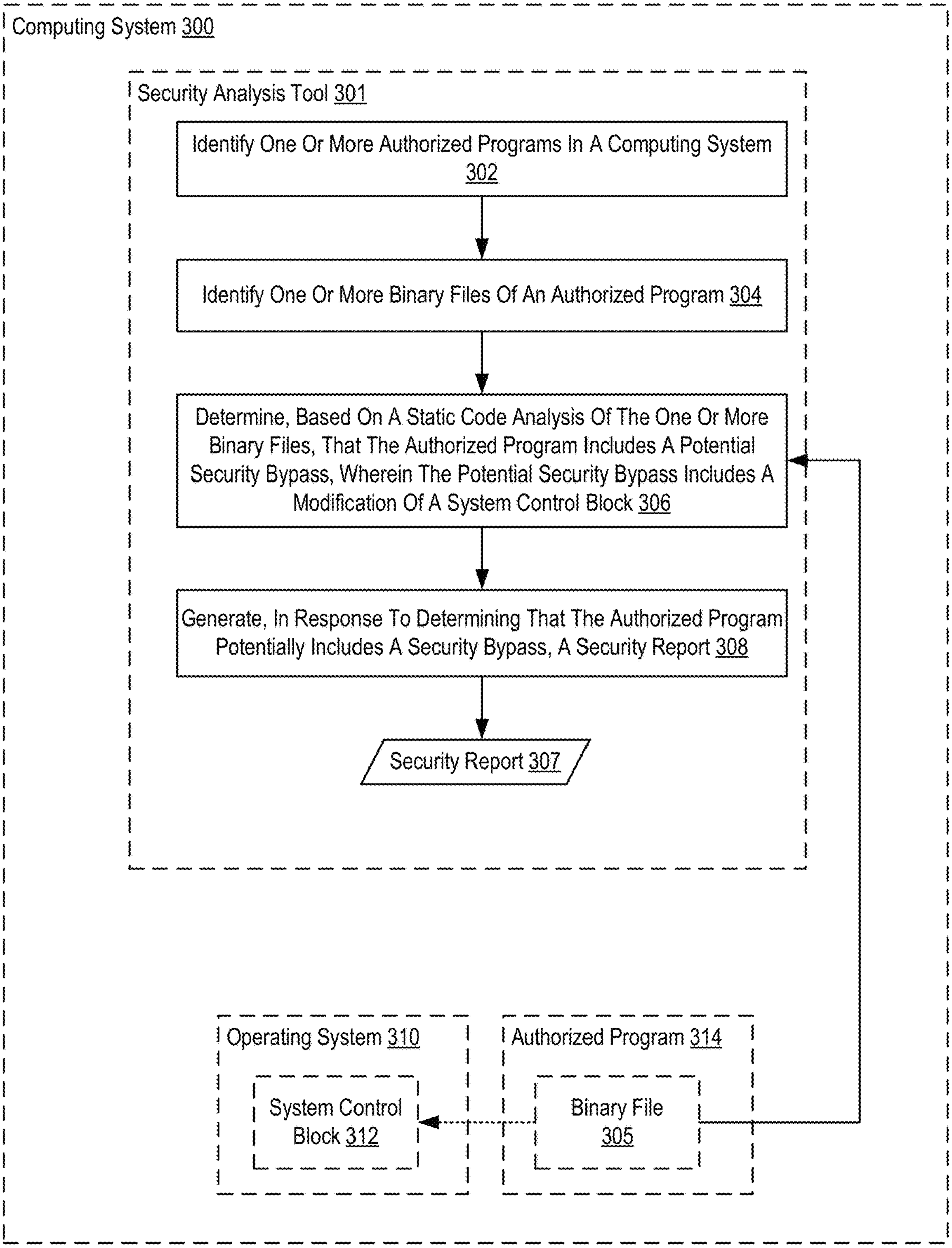
FIG. 3 is a flowchart of an example method for detecting a security bypass through binary code analysis according to some embodiments of the present disclosure.

For further explanation, FIG. 3 sets forth a flowchart illustrating an example method of detecting a security bypass through binary code analysis according to embodiments of the present disclosure. The example of FIG. 3 is described in the context of an example computing system 300 (e.g., the example computing system 100 of FIG. 1 or the example computing system 200 of FIG. 2). The example computing system may be based on, for example, the z/Architecture offered by International Business Machines (IBM). However, the use of such an architecture is provided only as one example for the computer system 300 and is not intended to limit the scope of the present disclosure. The computing system 300 includes an operating system 310 (e.g., the operating system 122 of FIG. 1) that implements a security or access control facilities that protects resources such as restricted areas of memory by granting access only to authorized users of the protected resources. In a particular example, the operating system 310 may be the z/OS operating system. In such examples, the access control facilities may include the APF and RACF. The operating system 310 employs one or more security-related system control blocks 312, such as the ACEE or the JSCB of the z/OS Operating System.

The computing system also includes at least one authorized program 314. An authorized program 314 may be linked to AC(1). For example, when the operating system 310 starts a new job step, the first program specified (the job-step program) must be linked to AC(1) and come from an authorized library for the step to run authorized. That program and subsequent programs in that step can execute programs from authorized libraries that do not have job-step authority. These programs, too, can run authorized. Thus, if the authorized program 314 can be run or manipulated to write in system key, this presents a serious security vulnerability. To identify such vulnerabilities, the computing system 300 also includes a security analysis tool 301 configured to detecting a security bypass through binary code analysis.

The method of FIG. 3 includes identifying 302 one or more authorized programs 314. In some examples, a security analysis tool 301 identifies 302 the one or more authorized programs 314 by scanning the computing system 300 for authorized programs and generating a list of load modules of interest. The authorized programs may include AC(1) programs, SVC routines, and PC routines. For example, the security analysis tool 301 can use system services to determine the list of APF-authorized libraries or executable UNIX files and determine which programs are AC(1). For example, in the z/OS operating system, these programs can be shown in multiple virtual storage (MVS) with a DISPLAY command or in UNIX system services (USS) with a FIND command. In both cases, further processing can be performed to refine the list of authorized programs. For MVS programs, first the APF list can be obtained either through a CONSOLE command or a system service like CSVAPF. Next the members of the data set can be examined using a service such as BLDL or reading the directory entries for the partitioned data set or load library to determine which of the programs or aliases in those APF authorized libraries were linked with SETCODE AC(1). The results can be saved to an output table. For USS programs, the FIND command output can provide the list of programs with the APF attribute. However, the FIND command cannot tell if the programs were linked as AC(1). In some examples, USS syscalls for LOAD can be used in order to verify USS binaries are AC(1). The security analysis tool 301 can also use available APIs and control block formats to identify a list of SVC routines and PC routines.

The method of FIG. 3 also includes identifying 304 one or more binary files 305 for an authorized program. In some examples, the security analysis tool 301 identifies 304 one or more binary files of an authorized program from the list of authorized programs by determining the load modules associated with the authorized program. Once the list of authorized programs has been established, the security analysis tool 301 analyzes all binaries in all APF authorized libraries and the link pack area or nucleus or, alternatively, analyzes binaries only for authorized services, depending on time constraints for performing the scan. However, there are advantages to scanning all code in all libraries or storage areas that could run in an authorized state since any of them could potentially escalate privilege to write in system key if called by another program.

The method of FIG. 3 also includes determining 306, based on a static code analysis of the one or more binary files 305, that the authorized potentially includes a potential security bypass, wherein the potential security bypass includes a modification of a system control block 312. In some examples, the security analysis tool 301 determines 306 that the authorized program includes 306 a potential security bypass first dissembling a binary file. For example, the binary file may be translated into opcodes, registers, and values to identify the original assembly language instruction based on the known instruction set architecture. In the z/OS operation system, for example, tools such as the HLASM or ASMADOP tool may be used to disassemble the binary files.

The security analysis tool 301 then determines whether any disassembled instruction or sequence of instructions potentially modifies a system control block security setting directly, i.e., without calling an appropriate security interface to modify the system control block. For example, the security analysis tool 301 can determine whether any instruction or sequence of instructions touches system control block storage for system control blocks of interest, regardless of whether the instruction is one that would traditionally be used to modify a system control block. The security analysis tool 301 can further determine whether any instruction or sequence of instructions modifies specific control block bits that may be used to bypass security facilities. In some examples, the system control blocks of interest include the ACEE control block and the JSCB control block. In the ACEE control block, security settings of interest can include the ACEEPRIV, ACEESPEC, and ACEEOPER fields. In the JSCB control block, security settings of interest can include the JSCBAUTH and JSCBPASS fields. When any of the disassembled instructions potentially modifies a field in a system control block that is usable to escalate privilege, the security analysis tool 301 identifies the instruction(s) as a potential security bypass improper privilege escalation, or other security risk.

Static code analysis only requires the binary code itself to be disassembled and evaluated and is therefore more flexible than dynamic testing, which can be dependent on environmental factors, variable workloads, or random input values. For example, some executable code might not even exist in a test environment unless it was a perfect replica of the production environment being evaluated. Further, watching for program checks or store and fetch violations could miss a whole class of security bypasses that do not cause program checks and seem to be working well until the code is disassembled. Still further, a target program can be written in different ways to modify data. Detecting specific actions being taken to bypass security though static code analysis allows for security risks to be detected that would have otherwise been missed.

The method of FIG. 3 also includes generating 308, in response to determining that the authorized program 314 includes a potential security bypass, a security report 307. In some examples, the security analysis tool 301 generates a report that identifies the instruction(s) that effect the security bypass as well as the offset of the instructions within the load module. The report 307 may also include surrounding instructions that show the context or origin of the pointers. The security report may also include any eyecatchers or identifying characteristics of the code or load module to help identify the program. The security report 307 may also be the origin of the load module or program from a specific data set, LPA, or nucleus. In some examples, the security analysis tool 301 stores the security report 307 in a file or data set that is restricted to access by authorized users due to the sensitive nature of the results, or writes the security report 307 to a system log. In some examples, the security report 307 is accompanied by an alert to a user or administrator. For example, the security report 307 may be provided in a user interface that presents the user or administrator with options such as removing authorization from unsafe libraries or even deleting or uninstalling any products that are creating risks for the system.

Figure 4:
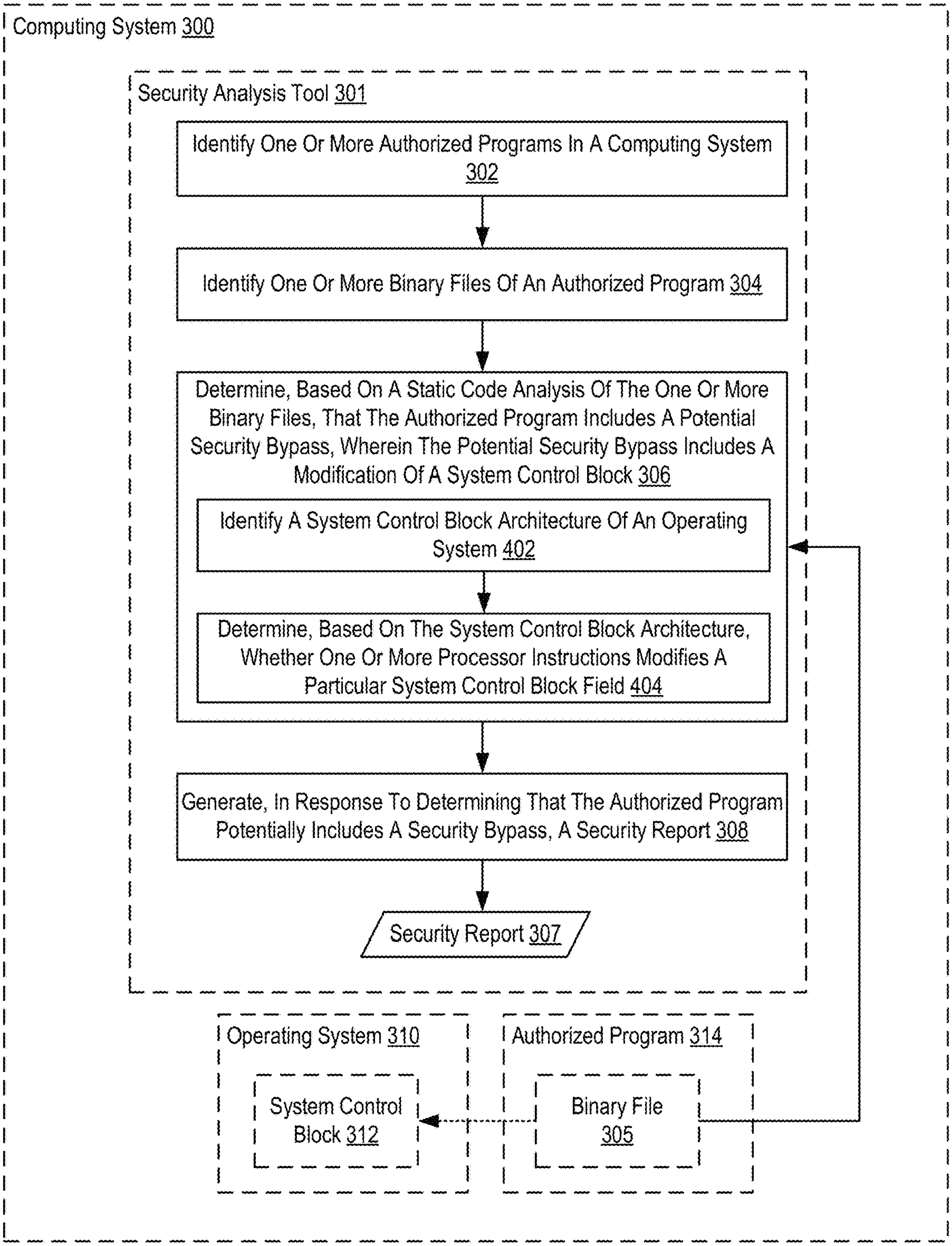
FIG. 4 is a flowchart of an example method for detecting a security bypass through binary code analysis according to some embodiments of the present disclosure.

For further explanation, FIG. 4 sets forth a flowchart illustrating an example method of detecting a security bypass through binary code analysis according to embodiments of the present disclosure. The method of FIG. 4 extends the method of FIG. 3 in the static code analysis in FIG. 4 includes identifying 402 a system control block architecture of an operating system. In some examples, the security analysis tool 301 identifies a system control block architecture using a table of system control blocks and their associated addresses and base pointers. Knowledge of control blocks are useful in finding out information about the system. In some examples, control blocks may be chained to one another and can span many areas of the operating system's internal structure. Each control block may contain an anchor pointer to the virtual address of another control block. A control clock can be accessed based on the known address of another control block containing a pointer to the control block of interest and where in the other control block that pointer is held. The structure of the control block chain is fixed by the operating system and is therefore available to the binaries as well as for static code analysis of the binaries. Further, the offsets of the fields within the control block are also fixed by the operating system. In the z/OS operating system, for example, to identify the location of the ACEE control block, it is known that the prefix system area (PSA) control block is stored at virtual address zero and includes a pointer to the base address of the address space control block (ASCB) at a particular offset in the PSA control block. A particular offset in the ASCB includes a pointer to the base address of the address space extension control block (ASXB). A particular offset in the ASXB includes a pointer to the base address of the ACEE control block. Once the base address of the ACEE is determined, the locations of particular fields within the ACEE are known by particular offsets of the ACEE base address. For example, the ACEEPRIV field is located at a particular offset of the ACEE base address.

The static code analysis further includes determining 404, based on the system control block architecture, whether one or more processor instructions modifies a particular system control block field. In some examples, the security analysis tool 301 determines 404 whether one or more processor instructions modifies a control block field by identifying whether a sequence of instructions establishes the location of a system control block field of interest (e.g., the ACEE or JSCB) based on those instruction referencing pointers and offsets in the control block chain. The security analysis tool 301 the determines whether any instructions modify storage in the system control block with an emphasis on security fields such as ACEEPRIV, ACEESPEC, ACEEOPER, JSCBAUTH and JSCBPASS, as well as any other modification that could pose a risk. Determining that such a modification is attempted by the code would be based on knowing the locations of the anchors for the control block chains leading to the control blocks of interest as well as the offsets for the pointers leading to those control blocks and the offsets of significant bits or settings within those control blocks as well. As these anchor pointer locations and related offsets are fixed by the architecture of the operating system, identifying instructions that target these addresses and locations are candidates for potential security bypasses. However, the assembler code could be constructed to reference them in different ways, especially if attempted to evade detection. In one approach, the security analysis tool 301 focuses initially on the anchor pointer and offsets, regardless of the instructions being used to fetch data from those offsets and then finally to treat any instruction capable of modifying storage as a risk if it touches this storage, even if it is not a traditional instruction used to modify a control block like OR IMMEDIATE, such as a COMPARE and SWAP or a TRANSLATE instruction instead. In some implementations, the security analysis tool security analysis tool 301 may consider any instruction that can modify an ACEE or JSCB as a security risk.

In some cases, the inclusion of a security bypass may have good intentions. For example, security bypasses may be included to facilitate installation or configuration testing and then accidentally left in the final code, or may simply be the result of improper practices for system security. However, some security bypasses may be malicious and thus be configured to evade detection. Thus, in some examples, the security analysis tool 301 further scans the code for alternative means to reference the locations of security settings. For example, the security analysis tool 301 may detect that the instructions add X and subtract Y in order to arrive an address used to modify bits for a security setting.

Thus, a platform-specific security analysis is facilitated by understanding the system internals to detect when code is manipulating the security settings that allows for bypasses. The security analysis tool 301 identifies platform-specific security bypasses using knowledge of platform's control block structures, base pointers, and offsets to determine if specific bits are being set or cleared by the binary code and determine whether such manipulation creates a security risk. The security analysis tool 301 identifies security risks by detecting privilege escalation risks related to platform security settings that affect user authority levels.

Static code analysis in accordance with the present disclosure is performed without regard to the context of the binary code, thus there is no need to map code flows that can lead to false positives from incorrect maps. Further, the static code analysis can be performed against any executable code without the need for an environment for dynamic testing. The analysis can be performed independent of the system or state of the system where the code might eventually be executed. It can also be done on demand if modifications to authorized libraries are noticed.

Static code analysis in accordance with the present disclosure includes disassembling code not just to count occurrences of specific instructions or find text strings, but to analyze the control block structures and offsets being referenced by the instructions to determine if security relevant settings are being modified by the instructions. While counting junk or no-op instructions could have value for detecting code that has been modified or overwritten, it does not help to detect code that was written originally in a way that bypasses security and introduces risk.

In view of the explanations set forth above, readers will recognize a number of advantages of detecting a security bypass through binary code analysis according to embodiments of the present disclosure including:

- Analyzing binary files identifies security relevant control block settings that are being manipulated directly instead of using established security interfaces that can be controlled by an installation.
- Detecting specific actions being taken to bypass security though static code analysis allows for security risks to be detected that would have otherwise been missed.
- Static code analysis is more flexible than dynamic testing as it is independent of the environment, system, or state of the system where the code might eventually be executed.

Exemplary embodiments of the present disclosure are described largely in the context of a fully functional computer system for optimizing network load in multicast communications. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for detecting a security bypass through binary code analysis, the method comprising:

identifying one or more binary files of an authorized program;

performing static code analysis of code of the one or more binary files without executing the authorized program, performing the static code analysis comprising:

disassembling the code to obtain disassembled code, analyzing control block structures, base pointers, and offsets being referenced by instructions of the disassembled code, determining an address, of a security field of a system control block of an operating system, using one or more of the base pointers and one or more of the offsets, determining whether the instructions modify bits of the security field without using a security interface of the operating system;

determining, based on performing the static code analysis, that the authorized program includes a potential security vulnerability when the bits of the security field are modified without using the security interface;

generating, in response to determining that the authorized program includes the potential security vulnerability, a security report that identifies the potential security vulnerability; and causing an action to be performed based on the security report.

2. The method of claim 1, wherein the operating system is Z/OS.

3. The method of claim 2, wherein the authorized program is one of an AC(1) program, a supervisor call (SVC) routine, and a program call (PC) routine.

4. The method of claim 2, wherein a modification of the system security setting includes a modification of a Z/OS system control block, wherein the security setting includes at least one of a privilege and an authorization.

5. The method of claim 4, wherein the system control block is one of an accessor environment element (ACEE) and a job step control block (JSCB).

6. The method of claim 4, wherein the static code analysis includes:

identifying a system control block architecture of an operating system; and determining, based on the system control block architecture, whether one or more processor instructions modifies a particular system control block field.

7. The method of claim 6, wherein the system control block architecture includes a control block chain defined by pointers and offsets.

8. An apparatus for detecting a security bypass through binary code analysis, the apparatus comprising a computer processor, a computer memory operatively coupled to the computer processor, the computer memory having disposed therein computer program instructions that, when executed by the computer processor, cause the apparatus to carry out the steps of:

identifying one or more binary files of an authorized program configured to execute on a computing system based on Z/Architecture;

performing static code analysis of code of the one or more binary files without executing the authorized program, performing the static code analysis comprising:

disassembling the code to obtain disassembled code, analyzing control block structures, base pointers, and offsets, determining an address, of a security field of a system control block of an operating system, using one or more of the base pointers and one or more of the offsets, to determine if specific bits are being set or cleared by the code, and determining whether the code modifies specific bits of the security field without using a security interface of the operating system;

determining, based on performing the static code analysis, that the authorized program includes a potential security bypass when the specific bits of the security field are modified without using the security interface;

generating, in response to determining that the authorized program includes the potential security bypass, a security report that identifies the potential security bypass; and causing an action to be performed based on the security report.

9. The apparatus of claim 8, wherein the system control block is a Z/OS system control block.

10. The apparatus of claim 9, wherein the system control block includes one or more security settings for at least one of a user, job, or environment, wherein a security setting includes at least one of a privilege and an authorization.

11. The apparatus of claim 10, wherein the security interface is provided for changing the one or more security settings, and wherein the modification of the system control block bypasses the security interface.

12. The apparatus of claim 9, wherein the system control block is one of an accessor environment element (ACEE) and a job step control block (JSCB).

13. The apparatus of claim 9, wherein the system control block is a job step control block.

14. The apparatus of claim 8, wherein the static code analysis includes:

identifying a system control block architecture of an operating system; and determining, based on the system control block architecture, whether one or more processor instructions modifies a particular system control block field.

15. The apparatus of claim 14, wherein the system control block architecture includes a control block chain defined by pointers and offsets.

16. A computer program product for detecting a security bypass through binary code analysis, the computer program product disposed upon a computer readable storage medium, the computer program product comprising computer program instructions that, when executed, cause a computer to carry out the steps of:

identifying one or more binary files of an authorized program;

performing static code analysis of code of the one or more binary files without executing the authorized program, performing the static code analysis comprising:

disassembling the code to analyze control block structures, base pointers, and offsets being referenced by instructions, of the code, to determine whether a security setting of an operating system is being modified by the instructions, determining an address, of a security field of a system control block of an operating system, using one or more of the base pointers and one or more of the offsets, determining whether the instructions modify bits of the security field without using a security interface of the operating system;

determining, based on the static code analysis of the one or more binary files, that the authorized program includes a potential security bypass when the bits of the security field are modified without using the security interface;

generating, in response to determining that the authorized program includes a potential security bypass, a security report that identifies the potential security bypass; and causing an action to be performed based on the security report.

17. The computer program product of claim 16, wherein the system control block is a Z/OS system control block.

18. The computer program product of claim 17, wherein the system control block includes one or more security settings for at least one of a user, job, or environment, wherein a security setting includes at least one of a privilege and an authorization.

19. The computer program product of claim 18, wherein the security interface is provided for changing the one or more security settings, wherein the modification of the system control block bypasses the security interface, and wherein the security interface is a Resource Access Control Facility (RACF) in Z/OS.

20. The computer program product of claim 16, wherein the static code analysis includes:

identifying a system control block architecture of an operating system; and determining, based on the system control block architecture, whether one or more processor instructions modifies a particular system control block field.

* * * * *